United States Patent [19]

Dorrer et al.

[11] Patent Number: 4,473,687
[45] Date of Patent: Sep. 25, 1984

[54] POLYPROPYLENE MOLDING COMPOSITION AND PROCESS FOR ITS PREPARATION

[75] Inventors: Bernhard Dorrer, Frankfurt am Main; Friedrich Kloos, Mainz; Horst Neumann, Kelkheim; Helmut Strametz, Frankfurt am Main, all of Fed. Rep. of Germany

[73] Assignee: Hoechst Aktiengesellschaft, Frankfurt am Main, Fed. Rep. of Germany

[21] Appl. No.: 412,169

[22] Filed: Aug. 27, 1982

Related U.S. Application Data

[63] Continuation of Ser. No. 92,457, Nov. 8, 1979, abandoned.

[30] Foreign Application Priority Data

Nov. 11, 1978 [DE] Fed. Rep. of Germany ....... 2849114

[51] Int. Cl.$^3$ ...................... C08L 23/06; C08L 23/12; C08L 23/16
[52] U.S. Cl. ................................... 525/240; 525/322; 525/323; 525/324
[58] Field of Search ................. 525/322, 323, 240, 324

[56] References Cited

U.S. PATENT DOCUMENTS

| | | | |
|---|---|---|---|
| 3,256,367 | 6/1966 | Jayne, Jr. .............................. | 525/240 |
| 3,562,790 | 2/1971 | Coover et al. ......................... | 525/88 |
| 3,632,674 | 1/1972 | Aishima et al. ....................... | 525/88 |
| 3,873,642 | 3/1975 | Jell ....................................... | 525/240 |
| 3,974,236 | 8/1976 | Koga et al. ........................... | 525/323 |
| 4,113,822 | 9/1978 | Matteoli et al. ...................... | 525/322 |
| 4,128,606 | 12/1978 | Furutachi et al. ................... | 525/322 |
| 4,226,741 | 10/1980 | Luciani et al. ....................... | 526/125 |
| 4,245,062 | 1/1981 | Suzuki et al. ........................ | 525/323 |
| 4,310,639 | 1/1982 | Hagemeyer, Jr. et al. .......... | 525/323 |
| 4,331,561 | 5/1982 | Luciani et al. ....................... | 526/125 |

FOREIGN PATENT DOCUMENTS

| | | |
|---|---|---|
| 1806126 | 7/1970 | Fed. Rep. of Germany . |
| 2643143 | 6/1977 | Fed. Rep. of Germany . |
| 2700774 | 8/1977 | Fed. Rep. of Germany . |
| 2801217 | 7/1978 | Fed. Rep. of Germany . |
| 2417093 | 9/1979 | Fed. Rep. of Germany . |
| 1509720 | 1/1966 | France . |
| 1456359 | 10/1966 | France . |
| 1488559 | 7/1967 | France . |
| 2266721 | 10/1975 | France . |
| 2340961 | 9/1977 | France . |
| 2377432 | 8/1978 | France . |
| 44-20621 | 9/1969 | Japan .................................. 525/523 |
| 49-30264 | 8/1974 | Japan . |
| 1046254 | 10/1966 | United Kingdom . |
| 1065568 | 4/1967 | United Kingdom . |
| 1566391 | 1/1968 | United Kingdom . |
| 1099853 | 1/1968 | United Kingdom . |
| 1114589 | 5/1968 | United Kingdom . |

*Primary Examiner*—Allan M. Lieberman
*Attorney, Agent, or Firm*—Curtis, Morris & Safford

[57] ABSTRACT

A polypropylene molding composition of polypropylene, ethylene-propylene copolymer and polyethylene having a high hardness and increased impact strength and homogeneity after processing is obtained by way of a continuous three-stage polymerization, when the melt viscosities of the polymer mixtures obtained in the individual stages are in a determined ratio of one to the other.

7 Claims, No Drawings

POLYPROPYLENE MOLDING COMPOSITION AND PROCESS FOR ITS PREPARATION

This is a continuation of application Ser. No. 92,457, filed Nov. 8, 1979 and now abandoned.

The present invention relates to a thermoplastic molding composition consisting of polypropylene, ethylenepropylene copolymer and polyethylene and having a higher impact resistance and an improved homogenizability, and to a polymerization process for its preparation.

Isotactic polypropylene can be processed into molded articles which show advantageous mechanical properties, above all a high hardness, rigidity and dimensional stability even at elevated temperatures. For many applications, the high stress crack resistance is a favorable factor. On the other hand, the high second order transition temperature of the polypropylene, which is above 0° C., is a drawback. It causes a strong reduction of the impact resistance and of the ultimate tensile strength and flexural strength of the articles manufactured of isotactic polypropylene with decreasing temperature. Attempts have been made to avoid this drawback by adding components having second order transition temperatures as low as possible to the polypropylene, preferably ethylene-propylene copolymers, or polyethylene and combinations thereof. It is particularly advantageous to prepare three-component mixtures of polypropylene, ethylene-propylene copolymer and polyethylene, since these mixtures show a higher hardness as compared with mixtures of polypropylene and ethylene-propylene rubber having the same impact strength and a considerably higher impact strength as compared with mixtures of polypropylene and polyethylene having the same hardness. Mixtures of this kind may be prepared from the individual components in roll mills, kneaders or extruders. However, they are also formed according to various methods of block copolymerization with Ziegler-Natta catalysts. These processes of copolymerization are particularly advantageous, since the polymer mixture is obtained with improved impact resistance and toughness in a pulverulent form. This may possibly help to avoid the necessity of a granulation process prior to the processing of the mixtures.

The preparation of three-component mixtures of this kind by way of polymerization is carried out by the controlled addition of a comonomer—above all ethylene—after, during or before the homopolymerization of the propylene, in which process a copolymer of a determined composition and a second homopolymer are formed depending on the monomer ratio in the reaction mixture. With regard to the properties and quantitative proportions of the individual components there is a great number of possible variations (cf. British Patent Nos. 970,478; 978,893, and 994,416). The observance of determined quantitative ratios and melt or solution viscosities of the individual components has proved to be advantageous.

Thus, a polypropylene molding composition has been described which is prepared by a polymerization process and which contains polypropylene, ethylene-propylene copolymer and polyethylene. The melt flow index of said composition is below that of its polypropylene portion, but higher than that of a polypropylene showing the same reduced specific viscosity (cf. German Offenlegungsschrift No. 24 17 093).

There have also been described mixtures which have been prepared by a three-step polymerization with the use of a special catalyst system (cf. German Offenlegungsschriften Nos. 27 00 774 and 28 01 217). The molecular weight of the ethylene-propylene copolymer should be as high as possible, whereas the intrinsic viscosity of the polyethylene, ascertained in solution, is at least 2.6 in the first case and from 0.5 to 2.6 in the other case.

However, a drawback of the known impact-resistant polypropylene molding compositions, which are three-component mixtures prepared by copolymerization processes—particularly the continuous processes—resides in the fact that the properties of molded articles manufactured thereof depend very strongly on the processing conditions and on the possible previous granulation. Thus, the very products of high impact strength according to the state of the art are particularly unsuitable for the preparation of thin-walled parts and sheets, since they contain inhomogeneities in the form of very small knots. These so-called "specks" are present especially in cases where the three-component mixture has been prepared by a continuous polymerization process in a cascade of reactors.

These specks not only adversely affect the appearance and optical properties of the molded articles, but also reflect a loss of elastomer components. For, in most cases they consist of ethylene-propylene copolymer and/or polyethylene, i.e. the very components which have been prepared specifically in order to increase the impact strength. However, their presence in the molded article cannot be optimally effective, as they are in large agglomerates due to insufficient homogenization. On the other hand, a higher impact strength is obtained with a homogeneous product of the same gross composition. When comparing products of the same impact strength, the more homogeneous product can at the same time be prepared in a more economical manner, since its content of the comonomer which is more expensive than propylene can be lower.

These inhomogeneities in the form of specks also are weak points, at which the material is damaged first of all in the case of mechanical strain.

Besides, the known polymerization processes involve further drawbacks in that additional measurements or calculations and comparisons have to be carried out in order to maintain the conditions desired. These processes require much time and labor and permit the controlling of the production introduces inherent delays, so that rearrangements of production are very expensive.

It has therefore been the object of the invention to provide polypropylene molding compositions which are not subject to the described drawbacks and a process for their preparation, especially by way of continuous operation.

It has now been found that three-component mixtures of polypropylene, ethylene-propylene copolymer and polyethylene with a high hardness as well as an improved impact strength and homogeneity after processing can be obtained by way of continuous three-step polymerization, when the melt viscosities of the polymer mixtures obtained in the individual steps are brought into a determined ratio of one to the other.

Thus, the subject of the invention is the molding composition specified in the claims, the process for its preparation and its use for the manufacture of molded articles.

The molding composition of the invention contains from 55 to 98.5, preferably from 65 to 94, % by weight of polypropylene and in a very fine distribution from 1 to 25, preferably from 3 to 20, % by weight of ethylene-propylene copolymer and from 0.5 to 30, preferably from 3 to 20, % by weight of polyethylene containing, statistically incorporated propylene molecules up to a maximum of 5% by weight.

The polypropylene (A) which is prepared first is highly crystalline and has a melt flow index MFI of 230/5, measured according to DIN 53 735, of from 0.1 to 80, preferably from 1 to 60, g/10 min.

The melt flow index MFI 230/5 of the mixture of polypropylene (A) plus the ethylene-propylene-copolymer (B) and that of polypropylene (A) are in the following ratio to each other:

$$0.2 \leq \frac{MFI(A + B)}{MFI(A)} \leq 1, \quad (1)$$

preferably $$0.5 \leq \frac{MFI(A + B)}{MFI(A)} \leq 1.$$

At the same time, the melt flow index MFI 230/5 of the polypropylene molding composition (A+B+C) and that of the mixture of polypropylene plus the ethylene-propylene copolymer are in the following ratio to each other:

$$0.5 \leq \frac{MFI(A + B + C)}{MFI(A + B)} \leq 1, \quad (2)$$

preferably $$0.75 \leq \frac{MFI(A + B + C)}{MFI(A + B)} \leq 1.$$

The weight ratio of ethylene to propylene in the copolymer formed in step (b) should be in the range of from 25:75 to 75:25 % by weight, preferably from 35:65 to 65:35 and in particular from 40:60 to 60:40, % by weight.

The process of the invention for preparing the polypropylene molding composition of the invention is carried out in three steps (a, b and c), each of these three steps optionally being again divided into different stages which may occur in different reaction vessels, for example in the case of continuous operation.

The only prerequisite for the preparation of the molding composition of the invention and the execution of the process of the invention is a high cristallinity of the polypropylene portion. It is ensured by the use of a highly stereospecific catalyst system, for example a combination of a $TiCl_3$-containing component, which has been produced by reducing $TiCl_4$ with aluminum or organo-aluminum compounds of the type $AlR_nX_{3-n}$, where R represents an alkyl radical of from 1 to 16 carbon atoms, X represents a halogen atom and $3 \geq n \geq 1$ and which has been subjected to a thermal after-treatment, with an activator consisting of an organo-aluminum compound of the formula $AlR_mY_{3-m}$, where R again represents an alkyl radical of from 1 to 16 carbon atoms, Y represents a halogen atom and $3 \geq m \geq o$. It is also possible to use a $TiCl_3$ component which has been after-treated with complexing compounds, or to increase the stereospecificity of the catalyst system by adding so-called third components to the polymerization mixture, or to combine both measures with one another (compare German Offenlegungsschriften Nos. 14 95 629; 24 09 726 and 24 13 261.

It is however also possible to use a different $TiCl_3$ component, provided it gives, in combination with the above-mentioned activator, a highly stereospecific catalyst system, such as, for example, a commercial catalyst component of the composition $TiCl_3.\frac{1}{3}AlCl_3$, by itself or in conjunction with complexing agents to increase the stereo-specificity.

Suitable complexing compounds are, for example, ethers, thioethers, thiols, phosphines, amines, amides, ketones, esters and especially ethers of the formula R—O—R, where R denotes an alkyl radical with 1 to 16 carbon atoms. Examples of suitable third components for increasing the stereospecificity are cyclopolyenes, especially cycloheptatriene.

It is however also possible to employ a catalyst system which contains magnesium chloride as the solid component, electron donors if appropriate, and a compound of tri- or tetravalent titanium, and which is combined with an activator. Examples of electron donors used are oxygen-containing or nitrogen-containing organic compounds, such as esters and amines. Activators used are organo-metallic compounds of the formula $MeR^1_qZ_{p-q}$, where Me denotes a metal from main groups I, II, III or IV or sub-group II of the periodic table, preferably aluminum or zinc, especially aluminum, $R^1$ denotes a hydrocarbon radical of from 1 to 16 carbon atoms, preferably an alkyl radical of from 1 to 16 carbon atoms, especially an alkyl radical of from 2 to 12 carbon atoms, Z denotes hydrogen, a halogen atom or alkoxy or dialkylamine radicals of from 1 to 8 carbon atoms, p denotes the valency of Me and q denotes an integer as follows $1 \leq q \leq p$.

Chlorine-containing organo-aluminum compounds, such as dialkyl-aluminum monochlorides of the formula $AlR_2^1Cl$, or alkyl-aluminum sesquichlorides of the formula $Al_2R_3^1Cl_3$, where $R^1$ has the above-mentioned meaning, are particularly suitable. Examples which may be mentioned are $Al(C_2H_5)_2Cl$, $Al(iC_4H_9)_2Cl$ and $Al_2(C_2H_5)_3Cl_3$.

Aluminum trialkyls or dialkyl-aluminum hydrides are employed equally advantageously as activator components, examples being $Al(C_2H_5)_3$, $Al(C_2H_5)_2H$, $Al(C_3H_7)_3$, $Al(C_3H_7)_2H$, $Al(iC_4H_9)_3$ and $Al(iC_4H_9)_2H$.

Further suitable organo-aluminum compounds are the reaction products of aluminum trialkyls or of dialkyl-aluminum hydrides, which contain alkyl radicals of from 1 to 16 carbon atoms, with dienes containing 4 to 20 carbon atoms.

To increase the stereospecificity, the activators mentioned can, if appropriate, be combined with electron donors, for which purpose electron donors which are the same as, or are other than, those employed with the solid catalyst component can be used.

The preparation of the polypropylene molding composition is carried out in a diluent or in the gas phase. Suitable diluents are aliphatic or cycloaliphatic hydrocarbons, for example pentane, hexane, heptane, cyclohexane and methylcyclohexane. Further, it is also possible to use petrol fractions or hydrogenated diesel oil fractions which have been carefully freed from oxygen, sulfur compounds and moisture. It is however also possible to carry out the polymerization in the first stage in liquid propylene and in the following stages in an accordingly composed mixture of the pure monomers.

The catalyst concentration and the temperature and pressure conditions are selected in the same way as is usual for a propylene homopolymerization with the catalyst system employed. Thus, the concentration of the transition metal component is from 0.001 to 20 mmols/l, calculated on titanium, preferably from 0.01 to 10 mmols/l. The activator is employed in the same concentration.

The reaction is generally carried out in each of the three steps at a pressure of 0.5 to 40 bars, preferably 1 to 35 bars. The reaction temperature is in the range of 40°–90° C., preferably of 50°–85° C., especially of 55°–80° C.

With continuous operation, the monomers are added to the individual stages over the entire period of the polymerization and in constant ratios.

The means employed for regulating the molecular weight and hence the melt viscosity of the polymers are, in addition to the choice of the reaction temperature, advantageously the use of hydrogen, which is admixed to the monomers to be introduced into the reaction batch, in such amount that the conditions of the invention for the melt indices of the polymer mixture are obtained after the execution of each of the three steps. The amounts of hydrogen required for this purpose depend above all on the type of catalyst system used, in addition to the reaction conditions. The hydrogen concentration is as a rule from 0 to 10 molar %, calculated on the monomers present.

The polymer suspension obtained at the end of the polymerization in a diluent can be worked up in a known manner, for example by treatment with a suitable alcohol which is capable of dissolving the catalyst residues.

It is additionally possible to wash with water. Thereafter the product is filtered and dried; alternatively, the residues of dispersing medium are removed by steam distillation, followed by drying.

If a sufficiently active catalyst system is used, removal of the residual catalyst may be dispensed with entirely. In that case the molding composition can, after separating the suspending medium in a suitable filtering, decanting or centrifuging apparatus, be dried immediately or be subjected, as described above, to steam distillation. All equipment which ensures good mixing and effective heat exchange between steam and polymer granules is suitable for carrying out the steam distillation. Under certain circumstances it is also possible to dispense with the addition of water to produce a slurry, for example when using a steam-treatment screw. If in the execution of the steam distillation under normal pressure there are formed agglutinations and lumps of powder grains, this process step may as well be carried out under reduced pressure.

The powder obtained from the gas phase polymerization can be worked up analogously, by suspending the powder in a hydrocarbon/alcohol mixture.

For further processing, the common additives (stabilizers, lubricants, fillers, pigments, etc.) are admixed to the molding composition of the invention.

Due to its favorable homogenizability the molding composition of the invention can be used directly in the form of a powder for the manufacture of plastics articles without previous treatment in an extruder or kneader. Since its melt viscosity can be varied over the entire range required for the known processing methods, said composition can be processed according to all pertinent methods. The articles manufactured thereof have a high hardness, rigidity and elasticity, a high impact resistance and resistance to stress whitening down to temperatures of less than −40° C. and are marked by a strongly improved appearance, as there are practically no more specks, streaks and flow marks.

Another advantage is to be seen in the fact that monitoring the course of the polymerization reaction according to the invention involves, besides the common measuring and control devices, only the withdrawal of polymer samples, their drying and the measuring of the melt flow index; this eliminates the expensive subsequent separation into individual components and their analysis.

This is possible, since in the process of the invention the material losses due to the dissolution of polymer components in the dispersing agent are low, so that they hardly affect the exactness of the material balance by means of the amounts of gas fed in or drawn off.

More specifically, the properties of the polymers prepared were determined in accordance with the following methods:

The melt flow index MFI 230/5 was measured according to DIN (German Industrial Standard) 53 735 and indicated in g/10 min.

The ball indentation hardnesses were measured in accordance with DIN 53 456 on compression-molded sheets which had been annealed for 3 hours at 140° C. under $N_2$, cooled in the course of 3 hours and stored, for temperature adjustment, for 24 hours at 23° C. and a relative humidity of 50% in a climatic chamber.

In order to determine the mechanical properties at low temperatures, the impact penetration test was applied at −15° C. with electronic data processing according to DIN 53 443/2. For the said test there were examined injection-molded sheets of a thickness of 2 mm, which had the measurements 2×70×70 mm, and which had been manufactured in a tool provided with film gate. The injection-molded sheets were employed without any further pretreatment for the impact penetration test within a determined period of time.

The homogeneity of the molding composition was judged by the number of specks. For this purpose, a sheet having a thickness from 10 μm was at first prepared of the polymer powder, and thereafter the number of specks in the sheet detectable with the naked eye were determined for a square of an edge length of 10 cm. The so-called speck grade results from the number of specks, calculated on the square units, and the following scale has been laid down:

| Grade | Number of specks per cm² | |
|---|---|---|
| 1 | less than 1 | (very homogeneous) |
| 2 | 1 to 15 | |
| 3 | 15 to 30 | |
| 4 | 30 to 60 | |
| 5 | 60 to 100 | |
| 6 | more than 100 | (very inhomogeneous) |

The following Examples serve to illustrate the invention.

EXAMPLE 1

Preparation of the TiCl₃ catalyst component 32.7 l of a hydrogenated oxygen-free gasoline fraction (boiling point 140° to 165° C.) and 16.5 l of titanium tetrachloride (=150.0 mols) are introduced, with the exclusion of air and moisture, into a 300 liter stirring vessel. At 0° C., a solution of 33.34 kg of aluminum-ethyl sesquichloride (containing 125.0 mols of a aluminum-diethyl monochloride) in 100 kg of the gasoline fraction is added dropwise within 8 hours, while stirring (60 rpm) under nitrogen. A reddish-brown fine precipitate separates. Subsequently the mixture is stirred for 2 hours at 0° C. and then for 12 hours at room temperature.

Thereafter the suspension is heated for 4 hours at 90° C. and then for another 6 hours at 110° C. The precipitate is allowed to settle and is then separated from the supernatant mother liquor by decanting and washed five times with 60 l each of the gasoline fraction. The washed solid reaction product is resuspended in the gasoline fraction, and the suspension is adjusted to a concentration of 2 mols of $TiCl_3$/liter. The content of trivalent titanium in the suspension is determined by titration with a Ce(IV) solution.

Polymerization:

Polymerization is carried out continuously by using 5 stirring vessels connected in series and provided with impeller stirrers, the vessels being resistant to an internal pressure of up to 10 bars. The polypropylene is prepared in two vessels, and the ethylene-propylene copolymer and the polyethylene are prepared in one vessel each.

Step (a):

At a polymerization temperature of 58° C., 112 liters of the gasoline fraction are introduced per hour by pumping into the first vessel having a capacity of 1 m$^3$ and being kept fully charged, together with 0.50 mol each of the previously prepared $TiCl_3$ catalyst component and the same amount of aluminum-diethyl monochloride as activator. 39.4 kg/h of propylene and 28 standard liters/h of hydrogen are added to this mixture, whereby an internal pressure of 4.3 bars is established. The polymer suspension being formed passes through an overflow line provided with a pressure maintenance valve into the second vessel of the same type and size serving as secondary reactor and being kept at two thirds of its possible charge volume by way of level control. The pressure in the secondary reactor is 1.6 bars. Samples withdrawn of the polymer suspension contain 30.9% by weight of polypropylene powder whose melt flow index 230/5 is $8.0\pm0.1$ g/10 min.

Step (b):

1.8 kg/h of unreacted propylene and 7 standard liters/h of hydrogen are introduced, together with the amount of polymer suspension pumped off in order to keep the charge volume of vessel 2 at a constant level, into vessel 3 of a capacity of 0.35 m$^3$ and an internal temperature of 58° C., which vessel is being kept fully charged. Another 1.1 kg/h of propylene as well as 2.7 kg/h of ethylene are added in doses, the internal pressure being maintained at 3.1 bars by way of a control valve. When this value is exceeded, the polymer suspension passes into vessel 4 which corresponds to vessel 3 in its size and with regard to operation conditions. Another 1.5 kg of ethylene are fed into vessel 4 in doses. Its pressure is 1.9 bars. Samples of the polymer suspension withdrawn contain 34.6% by weight of pulverulent polymer mixture having a melt flow index 230/5 of $4.5\pm0.5$ g/10 min.

Step (c):

This polymer suspension is finally passed into the last polymerization vessel 5 which also has a capacity of 0.35 m$^3$. At an internal temperature of 50° C., another 0.9 kg/h of ethylene and 13 standard liters/h of hydrogen are added in doses, 0.3 kg/h of ethylene being already present in a dissolved form in the reaction mixture introduced. Nitrogen is introduced in order to maintain the pressure of 1.5 bars. The reaction mixture is passed from there into a final reactor which is not pressurized; and the mixture is under nitrogen in this final reactor. Samples of polymer suspension withdrawn therefrom contain 35.2% by weight of pulverulent final product with a melt flow index MFI 230/5 of $4.5\pm0.5$ g/10 min.

In the following section of the experimental plant 2.5 kg/h of i-propanol are added to the polymer suspension which is then treated for 3 hours at 70° C., in order to decompose the catalyst residues. The organic phase is extracted three times with demineralized water. Thereafter the polymer mixture is separated from the mother liquor at 60° C. and dried.

The throughput is 45.6 kg/h, the weight ratio of the polymer components formed in the three steps is 82:15:2 according to the material balance and, the weight ratio of ethylene to propylene in the copolymer of step (b) is 57:43.

The content of wax-like polymer in the mother liquor is 2.0% by weight.

The properties of the product are shown in the Table.

EXAMPLE 2

The process is carried out as has been described in Example 1, except for introducing 37.1 kg/h of propylene and 27 standard liters/h of hydrogen into vessel 1, additionally 0.9 kg/h of propylene and 4.1 kg/h of ethylene into vessel 3, 2.0 kg/h of ethylene and 4 standard liters/h of hydrogen into vessel 4 as well as 0.4 kg/h of ethylene and 7 standard liters/h of hydrogen into vessel 5.

The evaluation of the suspension samples from vessels 2, 4 and 5 gives for the melt flow indices of steps (a), (b) and (c) values of $8.0\pm1$, $2.7\pm0.5$ and $2.1\pm0.5$ g/10 min.

The throughput is 44.7 kg/h, the weight ratio of the polymer components formed in steps (a), (b) and (c) is 78:18:3, and the weight ratio of ethylene to propylene in the copolymer of step (b) is 67:33.

The content of wax-like polymer in the mother liquor is 1.5% by weight.

The properties of the product are shown in the Table.

EXAMPLE 3

The process is again carried out in accordance with Example 1, except for introducing 34.5 kg/h of propylene and 61 standard liters/h of hydrogen into vessel 1, additionally 1.4 kg/h of ethylene and 4 standard liters/h of hydrogen into vessel 3, 0.8 kg/h of ethylene and 9 standard liters/h of hydrogen into vessel 4 and 8.2 kg/h of ethylene and 36 standard liters/h of hydrogen into vessel 5. The evaluation of the suspension samples from vessels 2, 4 and 5 gives for the melt flow indices of steps (a), (b) and (c) values of $44\pm2$, $38\pm2$ and $30\pm2$ g/10 min.

The throughput is 44.9 kg/h, the weight ratio of the polymer components formed in steps (a), (b) and (c) is 73:8:19 and, the weight ratio of ethylene to propylene in the copolymer of step (b) is 53:47.

The content of wax-like polymer in the mother liquor is 3.6% by weight.

The properties of the product are indicated in the Table.

EXAMPLE 4

The process is again arried out as has been described in Example 1, except for introducing 45.5 kg/h of propylene and 5.3 standard liters/h of hydrogen into vessel 1, 0.6 kg/h of ethylene and 0.4 standard liter/h of hydrogen into vessel 3, 0.3 kg/h of ethylene into vessel 4 and 0.95 kg/h of ethylene together with 6.3 standard liters/h of hydrogen into vessel 5. The withdrawal of suspension samples from vessels 2, 4 and 5 shows, after measuring the melt flow indices, the values of 1.1±0.1, 1.0±0.1 and 1.0±0.1 g/10 min.

The throughput is 47.3 kg/h, the weight ratio of the polymer components formed in steps (a), (b) and (c) is 92:6:2, and the weight ratio of ethylene to propylene in the copolymer of step (b) is 32:68.

The content of wax-like polymer in the mother liquor is 0.9% by weight.

The properties of the product are indicated in the Table.

EXAMPLE 5

Preparation of a highly active catalyst component containing a carrier:

1. 702 g of anhydrous magnesium chloride (=7.37 mols) and 170.4 g of benzoic acid-ethyl ester (=1.13 mols) are ground for 100 hours in a vibration mill under a nitrogen blanket. The steel vessel used has a capacity of 5 l, and there are employed 15 kg of steel balls made of stainless steel having a diameter of 15 mm.

2. With the exclusion of air and moisture, 1.25 kg of titanium tetrachloride in 11 l of toluene are reacted in a 50 liter stirring vessel, within 15 minutes and at 25° C. each time, at first with 0.86 kg of di-n-butyl ether and subsequently with a solution of 0.38 kg of aluminum triethyl in 2 l of toluene, followed by a final reaction of 5 hours at the same temperature.

3. 3.29 kg of the material ground according to (1) are suspended in 150 l of a hydrogenated oxygen-free gasoline fraction (boiling point 140°-165° C.) in a 300 liter stirring vessel and heated to 80° C. Within 30 minutes the solution of the titanium compound prepared according to (2) is added in doses, whereupon the reaction mixture is maintained at 80° C. for another 2 hours. After cooling to room temperature, the solid material is separated under pressure and with the exclusion of air on a suction filter and washed three times with 80 l each of the gasoline fraction. Subsequently the solid is suspended in 100 l of the gasoline fraction. The titanium content of the suspension is determined by way of colorimetry.

Polymerization:

Polymerization is continuously carried out in 4 stirring vessels connected in series and provided with impeller stirrers, the vessels being resistant to an internal pressure of up to 10 bars. The steps (a) and (b) are effected in one vessel each, step (c) in two vessels, and for pressure release between vessels 2 and 3 as well as following vessel 4 there is intercalated in each case a heatable stirring vessel which is not pressurized.

Step (a):

At a polymerization temperature of 75° C., 210 l/h of the gasoline fraction are introduced per hour by pumping into the first vessel having a capacity of 1 m$^3$ and being kept fully charged, together with 13.4 g/h (=23 mmols of Ti/h) of the previously prepared catalyst component and 104.4 g/h (=914 mmols/h) of aluminum triethyl and 37.6 g/h of p-methyl-benzoic acid-ethyl ester. To this mixture are added in doses 63.7 kg/h of propylene and 53 standard liters/h of hydrogen, whereupon an internal pressure of 7.8 bars is established. The polymer suspension being formed contains—after pressure release and drawing off excess propylene—19.3% by weight of polypropylene powder having a melt flow index 230/5 of 29±2 g/10 min.

Step (b):

Via an overflow line with a pressure maintenance valve the polymer suspension can flow into the polymerization vessel 2 having a capacity of 0.35 m$^3$ and an internal temperature of 75° C., said vessel being maintained at an internal pressure of 7.2 bars by way of a control valve. Into the vessel which is largely filled with liquid, 8.9 kg/h of ethylene and 9 standard liters/h of hydrogen are added in doses to the 25.7 kg/h of propylene still dissolved. When opening the pressure maintenance valve, polymer suspension passes into a vessel which is not pressurized having a capacity of 0.35 m$^3$ and a low charge level. Said vessel is heated in order to keep its internal temperature at about 60° C., whereupon the predominant portion of the dissolved monomers (23.2 kg/h of propylene and 4.3 kg/h of ethylene) and the hydrogen escape, which is promoted by thorough stirring and rinsing with nitrogen. The polymer suspension withdrawn contains 20.9% by weight of polymer powder having a melt flow index MFI 230/5 of 21±1 g/10 min.

Step (c):

Thereafter the polymer suspension is pumped from the pressure release vessel into the third polymerization vessel of a capacity of 0.35 m$^3$, which is operated under the same temperature and pressure conditions as in step (b). There are added in doses 10.5 kg/h of ethylene and 29 standard liters/h of hydrogen. Subsequently the reaction mixture is introduced into a fourth reactor, in which another 7.5 kg/h of ethylene are added under the same conditions. Finally, the polymer suspension passes a pressure release valve and enters a vessel without pressure, whereby 4.3 kg/h of ethylene are set free. The suspension samples withdrawn contain 25.1% by weight of pulverulent final product having a melt flow index MFI 230/5 of 12±1 g/10 min. The solid polymer is separated from 4.3 kg/h of excess ethylene and the mother liquor and is dried in a nitrogen current.

The throughput in the device is 55 kg/h, the weight ratio of the polymer components formed in the three steps is 66:11:23 according to the material balance, and the weight ratio of ethylene to propylene in the copolymer of step (b) is 71:29.

The content of wax-like polymer in the mother liquor is 2.8% by weight.

The properties of the product are shown in the Table.

COMPARATIVE EXAMPLE 1

Example 5 is repeated with the modification that the execution of steps (a) and (b) is interrupted by an intermediate pressure release which serves to remove hydrogen, so that an ethylene-propylene copolymer is prepared according to the teaching of the art whose molecular weight is as high as possible.

Step (a):

While maintaining the amounts indicated in Example 5, a polymer suspension is formed which—upon removal of excess propylene—contains 21.4% by weight of polypropylene powder having a melt flow index 230/5 of 31±2 g/10 min. Via a pressure maintenance valve, said suspension is passed into a pressure release vessel having a capacity of 1 m³, whose charge level is kept at the lower third of its volume. By heating the contents to 60° C., stirring vigorously and rinsing with nitrogen, the propylene and hydrogen are removed almost entirely.

Step (b):

From the pressure release vessel, polymer suspension is continuously pumped into the polymerization vessel 2 having a capacity of 0.35 m³ and being maintained at an internal pressure of 7.2 bars and an internal temperature of 75° C. In this vessel, 27.2 kg/h of propylene and 6.9 kg/h of ethylene are added to the suspension, but no hydrogen. Via a pressure maintenance valve, the polymer suspension is passed in accordance with Example 5 into the pressure release vessel which is not pressurized having a capacity of 0.35 m³, in which 23.5 kg/h of propylene and 4.3 kg/h of ethylene are removed. The polymer suspension withdrawn contains 23.8% by weight of polymer powder having a melt flow index MFI 230.5 of 4.6±0.1 g/10 min.

Step (c):

From this second pressure release vessel, the polymer suspension is pumped successively into a third and fourth polymerization vessel of 0.35 m³ each, which are operated under the same temperature and pressure conditions as in step (b). 11.1 kg/h of ethylene and 34 standard liters/h of hydrogen are introduced in doses into each of the two vessels. The suspension samples withdrawn contain 28.6% by weight of pulverulent final product having a melt flow index MFI 230/5 of 5.5±0.2 g/10 min.

After separating 8.3 kg/h of excess ethylene and the mother liquor, the polymer powder is dried in the nitrogen current. The throughput is 63.1 kg/h, the weight ratio of the polymer components formed in the three steps is 68:10:22, and the weight ratio of ethylene to propylene in the copolymer of step (b) is 41:59.

The content of wax-like polymer in the mother liquor is 1.9% by weight.

The properties of the product are shown in the Table.

COMPARATIVE EXAMPLE 2

Example 1 is repeated with the modification that step (c) is executed without hydrogen regulation, in order to obtain a polyethylene portion according to the state of the art, whose molecular weight is as high as possible.

Step (a):

The process is carried out as in Example 1, however, while using only 17 standard liters/h of hydrogen. The samples of the polymer suspension withdrawn from the secondary reactor contain 30.4% by weight of polypropylene powder having a melt flow index MFI 230/5 of 3.6±0.1 g/10 min.

Step (b):

In addition to the amount still dissolved, another 3.7 kg/h of propylene, as well as 2.2 kg/h of ethylene and 11 standard liters/h of hydrogen are added in doses to the polymer suspension in vessel 3, while maintaining the internal pressure at 3.7 bars. In vessel 4, 1.5 kg/h of ethylene and 9 standard liters/h of hydrogen are added again, the internal pressure being 2.0 bars. Samples of polymer suspension withdrawn contain 33.5% by weight of polymer powder having a melt flow index 230/5 of 3.9±0.1 g/10 min.

Step (c):

In the last polymerization vessel, 2.0 kg/h of ethylene are again added under the conditions of Example 1, however, without adding hydrogen. Suspension samples withdrawn from the subsequent secondary reactor contain 34.8% by weight of polymer powder having a melt flow index MFI 230/5 of 1.2 g/10 min.

The isolation of the polymer mixture is carried out also in accordance with Example 1.

The throughput is 48.8 kg/h, the weight ratio of the polymer components formed in the three steps is 77:17:6 according to the material balance, and the weight ratio of ethylene to propylene in the copolymer of step (b) is 33:67.

The content of wax-like polymer in the mother liquor is 1.7% by weight.

The properties of the product are shown in the Table.

TABLE

Composition and properties of polypropylene molding compositions

| Example | Composition Step a (% by weight) | Composition Step b (% by weight) | Composition Step c (% by weight) | Composition Step b ethylene (% by weight) | Composition Step b propylene (% by weight) | Melt flow indices MFI 230/5 A (g/10') | A + B (g/10') | A + B + C (g/10') | Melt flow index ratio (A + B)/A | (A + B + C)/(A + B) |
|---------|------|------|------|------|------|------|------|------|------|------|
| 1 | 83 | 14 | 3 | 57 | 43 | 8.0 | 4.5 | 4.5 | 0.56 | 1.0 |
| 2 | 78 | 18 | 3 | 67 | 33 | 8.0 | 2.7 | 2.1 | 0.33 | 0.78 |
| 3 | 73 | 8 | 19 | 53 | 47 | 44 | 38 | 30 | 0.86 | 0.79 |
| 4 | 92 | 6 | 2 | 32 | 68 | 1.1 | 1.0 | 1.0 | 0.91 | 1.0 |
| 5 | 66 | 11 | 23 | 71 | 29 | 29 | 21 | 12 | 0.72 | 0.57 |
| C1 | 68 | 10 | 22 | 41 | 59 | 31 | 4.6 | 5.5 | 0.15 | 1.20 |
| C2 | 77 | 17 | 6 | 33 | 67 | 3.6 | 3.9 | 1.2 | 1.08 | 0.31 |

| Example | Ball indentation hardness (N/mm²) | Impact penetration test $L_s^{(1)}$ (mm) | Impact penetration test $F_s^{(2)}$ (N) | Speck grade |
|---------|------|------|------|------|
| 1 | 51.3 | 11.6 | 3164 | 2 |
| 2 | 47.5 | 14.8 | 3807 | 3 |
| 3 | 55.6 | 9.4 | 3416 | 3 |
| 4 | 68.7 | 5.2 | 1371 | 1 |
| 5 | 58.3 | 10.1 | 3522 | 3 |
| C1 | 61.1 | 4.2 | 1289 | 6 |

TABLE-continued

Composition and properties of polypropylene molding compositions

| | | | | |
|---|---|---|---|---|
| C2 | 48.0 | 6.8 | 2047 | 4 |

(1) $L_s$ = damaging deformation
(2) $F_s$ = damaging force

What is claimed is:

1. A polypropylene molding composition comprising from 55 to 98.5% by weight of polypropylene (A), from 1 to 25% by weight of ethylene-propylene copolymer (B) and from 0.5 to 30% by weight of polyethylene (C), produced by the polymerization and copolymerization of propylene and ethylene in three steps (a, b and c) in the presence of a Ziegler catalyst, by preparing in the first step (a) a highly crystalline polypropylene having a melt flow index MFI 230/5 of 0.1 to 80 g/10 min, copolymerizing in the second step (b) propylene and ethylene in a manner that the weight ratio of ethylene to propylene in the copolymer is 25:75 to 75:25 and the ratio of the melt flow index MFI 230/5 of the mixture of polypropylene (A) and the ethylene-propylene copolymer (B) to that of polypropylene (A) is $$0.2 \leq \frac{MFI(A+B)}{MFI(A)} \leq 1 \quad (1)$$

and preparing in the third step (c) a polyethylene in a manner that the ratio of the melt flow index MFI 230/5 of the polypropylene molding composition (A+B+C) to that of the mixture of polypropylene (A) and the ethylene-propylene copolymer (B) is $$0.5 \leq \frac{MFI(A+B+C)}{MFI(A+B)} \leq 1. \quad (2)$$

2. A polypropylene molding composition as defined in claim 1, which comprises from 65 to 94% by weight of polypropylene (A), from 3 to 20% by weight of ethylene-propylene copolymer (B) and from 3 to 20% by weight of polyethylene (C).

3. A polypropylene molding composition as defined in claim 1 or 2, wherein the ratio of the melt flow index MFI 230/5 of the mixture of polypropylene (A) and the ethylene-propylene copolymer (B) of that of polypropylene (A) is $$0.5 \leq \frac{MFI(A+B)}{MFI(A)} \leq 1$$

and the ratio of the melt flow index MFI 230/5 of the polypropylene molding composition (A+B+C) to that of the mixture of polypropylene (A) and the ethylene-propylene copolymer (B) is $$0.75 \leq \frac{MFI(A+B+C)}{MFI(A+B)} \leq 1.$$

4. A polypropylene molding composition as defined in claim 8, wherein, in the copolymer, the ethylene units are present in a ratio, to the propylene units, of from 35:65% by weight to 65:35% by weight.

5. A polypropylene molding composition as defined in claim 1, wherein, in the copolymer, the ethylene units are present in a ratio, to the propylene units, of from 40:60% by weight to 60:40% by weight.

6. A polypropylene molding composition as defined in claim 1, wherein, in the copolymer, the ethylene units are present in a ratio, to the propylene units, of from 32:68% by weight to 71:29% by weight.

7. A polypropylene molding composition as defined in claim 1, wherein, in the copolymer, the ethylene units are present in a ratio, to the propylene units, of from 53:47% by weight to 67:33% by weight.

* * * * *